UNITED STATES PATENT OFFICE.

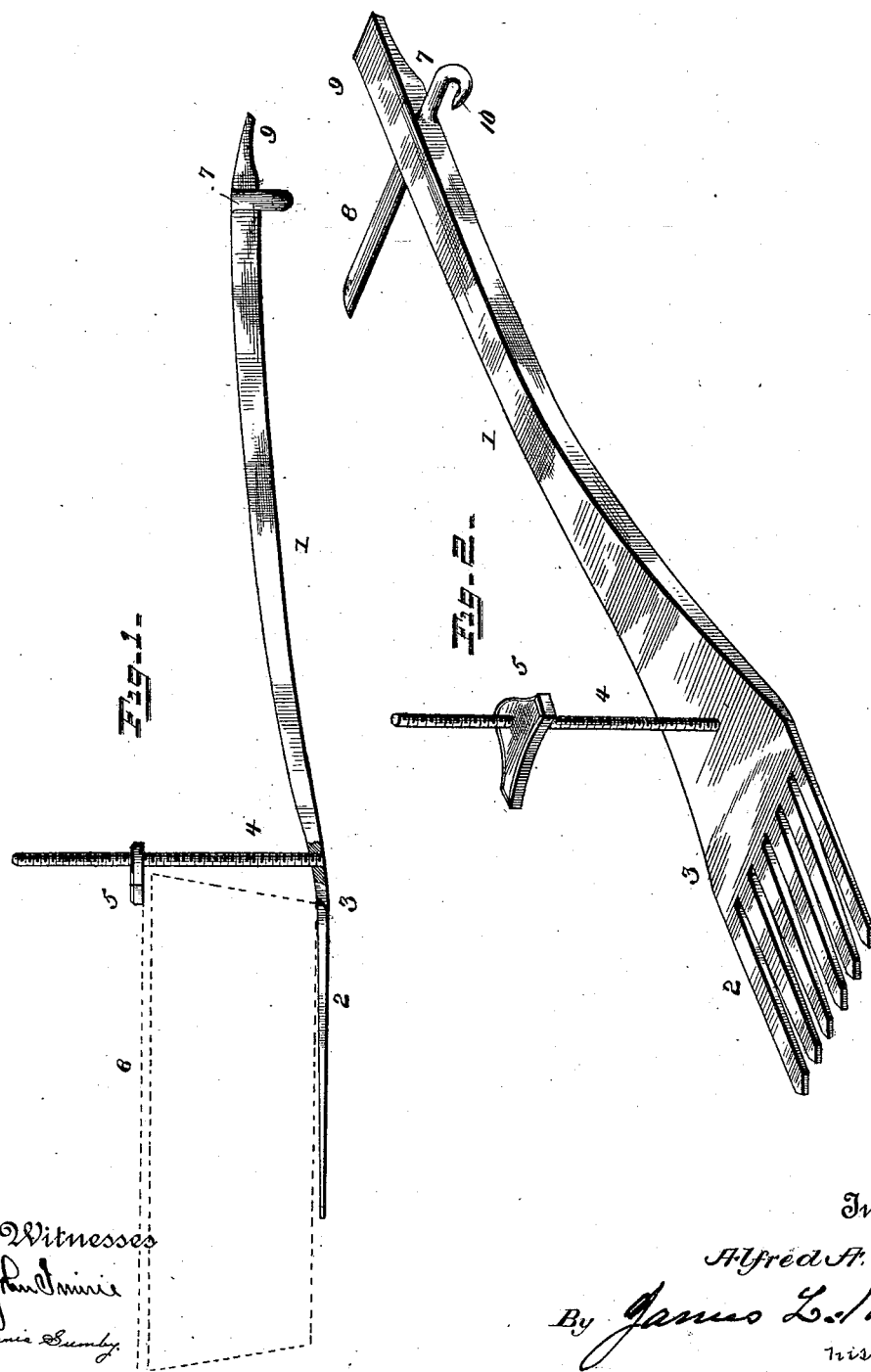

ALFRED A. CUDDY, OF CARLISLE, PENNSYLVANIA.

COMBINATION KITCHEN-TOOL.

SPECIFICATION forming part of Letters Patent No. 512,162, dated January 2, 1894.

Application filed September 12, 1893. Serial No. 485,308. (No model.)

*To all whom it may concern:*

Be it known that I, ALFRED A. CUDDY, a citizen of the United States, residing at Carlisle, in the county of Cumberland and State of Pennsylvania, have invented new and useful Improvements in a Combination Kitchen-Tool, of which the following is a specification.

This invention has for its object to provide a novel, simple and economical implement useful for many purposes, but particularly designed for use as a fork and for baking cakes, raking fires and lifting hot pans, plates, dishes, kettles and other objects or vessels.

To accomplish this object my invention consists in a kitchen implement or tool possessing the characteristic features of construction hereinafter described and claimed, reference being made to the accompanying drawings illustrating my invention, in which—

Figure 1 is a side elevation of the improved device applied to a pan for lifting the same, and Fig. 2 is a detail, perspective view of the implement.

In order to enable those skilled in the art to make and use my invention I will now describe the same in detail, referring to the drawings, wherein—

The numeral 1 indicates a shank which may be of angular or other form in cross section and composed of metal or material suitable for the conditions required. The shank is expanded and flattened at one end to form a cake-turner, fork and pan or plate rest composed of a series of parallel tines 2 having flat upper and lower surfaces and extending from a head portion 3—, to which is rigidly attached a vertical screw threaded rod 4. This rod carries a clamp-plate 5, having a screw threaded connection therewith and adjustable to different heights, in such manner that if the forked cake-turner be inserted beneath a pan or other vessel or object 6, the clamp-plate can be adjusted down upon the rim of the pan, or vessel for clamping it to the forked cake-turner and thus render it possible to lift and carry the pan or vessel as occasion may require. This part of the device is particularly useful for handling hot pans, plates and other kitchen utensils. The expanded, flattened and forked end of the shank also serves for turning or manipulating cakes while baking, and for lifting hot pie plates and other dishes, while the lines render the device susceptible of being used for all of the purposes for which a kitchen fork is ordinarily employed.

The end of the shank 1, opposite the cake-turner and pan or plate rest is fashioned into a kettle or pot-lifter and poker, which parts are formed by laterally projecting arms 7 and 8 extending at right angles from the shank in proximity to the end 9 thereof, leaving this end projecting to form a stove-lid lifter. The arm 7 is bent into a hook 10, adapted to engage the bail or handle of a kettle or pot, in such manner that the shank can be grasped in one hand for carrying the kettle or pot to any place desired.

The shank, forked cake-turner, poker, pot-lifter and stove-lid lifter, can all be formed integral, thus enabling the implement to be economically manufactured.

The poker is useful for raking fires or cleaning stove-grates, and when not in use the poker and pot-lifter end of the implement can be utilized to suspend it from a nail or hook.

I prefer to construct the device of malleable iron which is not liable to break and can be brightly polished, but I do not confine myself to any particular material.

The screw threaded rod 4, is screwed into the head portion 3 of the forked cake-turner, so that such rod can be detached for the more convenient use of the cake-turner and the poker, pot-lifter and lid-lifter.

This invention provides a very simple and useful kitchen tool or implement which can be employed for many purposes other than those specifically mentioned, although it is more especially intended for handling hot pans, plates, kettles and the like, baking cakes and raking fires, and cleaning grates.

Having thus described my invention, what I claim is—

1. A kitchen implement, consisting of a shank having at one end a flattened pan or plate rest, a screw-threaded rod extending from the shank in juxtaposition to the pan or plate-rest, and a clamp-plate engaging the screw-thread of and adjustable on said rod, for clamping a pan or plate on said rest, substantially as described.

2. A kitchen utensil, consisting of a shank having a forked, flattened cake-turner and pan-rest, a screw rod extending from the shank, and a clamp-plate adjustable on the screw-rod, for clamping a pan or other article on the said rest, substantially as described.

In testimony whereof I have hereunto set my hand in presence of two subscribing witnesses.

ALFRED A. CUDDY.

Witnesses:
  THEO. CORNMAN,
  F. H. HOFFER.